United States Patent
Yin et al.

(10) Patent No.: US 10,667,466 B2
(45) Date of Patent: Jun. 2, 2020

(54) KNOTTING DEVICE DRIVEN BY TWO TOOTHED DISCS

(71) Applicant: JIANGSU UNIVERSITY, Jiangsu OT (CN)

(72) Inventors: Jianjun Yin, Jiangsu (CN); Wanqing Zhang, Jiangsu (CN); Yaming Chen, Jiangsu (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 83 days.

(21) Appl. No.: 15/719,593

(22) Filed: Sep. 29, 2017

(65) Prior Publication Data

US 2018/0042182 A1    Feb. 15, 2018

Related U.S. Application Data

(63) Continuation-in-part of application No. PCT/CN2015/097646, filed on Dec. 17, 2015.

(30) Foreign Application Priority Data

Apr. 3, 2015   (CN) ........................... 2015 1 0161254
Dec. 7, 2015   (CN) ........................... 2015 1 0890000

(51) Int. Cl.
*A01F 15/14* (2006.01)
*A01F 15/08* (2006.01)

(52) U.S. Cl.
CPC ........ *A01F 15/145* (2013.01); *A01F 15/0858* (2013.01)

(58) Field of Classification Search
CPC .... A01F 15/145; A01F 15/0858; A01F 15/14; A01F 15/08; A01F 2015/0866
See application file for complete search history.

(56) References Cited

U.S. PATENT DOCUMENTS

| 2,403,396 A | * | 7/1946 | Raney .................... A01F 15/14 100/19 A |
| 2,723,871 A | * | 11/1955 | Rudeen ................. A01F 15/145 289/10 |
| 2,926,599 A | * | 3/1960 | McClellan ........... A01F 15/145 100/22 |
| 3,243,214 A | * | 3/1966 | Keates ................... A01F 15/14 289/18.1 |

(Continued)

FOREIGN PATENT DOCUMENTS

| CN | 102124874 A | 7/2011 |
| CN | 101953259 B | 6/2012 |

(Continued)

*Primary Examiner* — Shaun R Hurley
*Assistant Examiner* — Bao-Thieu L Nguyen
(74) *Attorney, Agent, or Firm* — Soroker Agmon Nordman Pte Ltd

(57) ABSTRACT

The invention discloses a knotter driven by double fluted disc. The knotter driven by double fluted disc comprises a small fluted disc, a knotter rack, a large fluted disc, a cutter arm assembled on the knotter rack, a knotter jaw and bill hook combined mechanism (R), a rope gripper driving mechanism (Q) and a rope gripper (J), wherein a composite fluted disc of traditional D-knotter is divided into the small fluted disc and the large fluted disc in the knotter driven by double fluted disc.

12 Claims, 15 Drawing Sheets

(56) References Cited

U.S. PATENT DOCUMENTS

| | | | |
|---|---|---|---|
| 3,254,911 A * | 6/1966 | Crawford | A01F 15/145 289/13 |
| 3,400,959 A * | 9/1968 | Grillot | A01F 15/145 289/11 |
| 4,022,121 A * | 5/1977 | Crawford | A01F 15/14 100/29 |
| 4,735,446 A * | 4/1988 | Homberg | A01F 15/145 289/2 |
| 6,164,197 A * | 12/2000 | Prellwitz | A01F 15/145 100/20 |
| 6,957,835 B2 * | 10/2005 | Rotole | A01F 15/145 100/29 |
| 7,752,959 B1 * | 7/2010 | Roth | A01F 15/145 100/22 |
| 8,590,945 B2 * | 11/2013 | Schumacher | A01F 15/145 289/2 |
| 8,671,834 B1 * | 3/2014 | Rotole | A01F 15/148 100/4 |
| 9,226,453 B2 * | 1/2016 | Schoonheere | A01F 15/145 |
| 9,474,259 B2 * | 10/2016 | Banda | A01K 91/04 |
| 9,603,309 B2 * | 3/2017 | Becker | A01F 15/145 |
| 9,807,941 B2 * | 11/2017 | Demulder | A01F 15/145 |
| 9,832,932 B2 * | 12/2017 | Schumacher | A01F 15/145 |
| 2004/0045452 A1 * | 3/2004 | Schumacher | A01F 15/145 100/4 |
| 2005/0110276 A1 * | 5/2005 | Rotole | A01F 15/145 289/2 |
| 2012/0211979 A1 * | 8/2012 | Schumacher | A01F 15/145 289/2 |
| 2015/0097370 A1 * | 4/2015 | Schumacher | A01F 15/145 289/1.5 |
| 2015/0305246 A1 * | 10/2015 | Demulder | A01F 15/145 100/33 R |
| 2017/0000034 A1 * | 1/2017 | Becker | A01F 15/145 |
| 2019/0053437 A1 * | 2/2019 | Figger | A01F 15/145 |

FOREIGN PATENT DOCUMENTS

| | | |
|---|---|---|
| CN | 202873378 U | 4/2013 |
| CN | 104823607 A | 8/2015 |
| DE | 20317302 U1 | 4/2005 |
| DE | 102008041120 A1 | 2/2010 |

\* cited by examiner

KNOTTING DEVICE DRIVEN BY TWO TOOTHED DISCS

FIELD OF THE INVENTION

The invention relates to the technical field of straw or herbage harvesting and bundling, and relates specifically to a kind of knotter driven by double fluted disc.

BACKGROUND OF THE INVENTION

The rectangular bale baler is widely used in the collection and bundling of straw and herbage in rural areas and meadow. Knotter is the core component of the rectangular bale baler. The main function of the knotter is to finish several motions including rope-gripping, knot-winding, rope-hooking, rope-cutting and knot-tripping, and form a fast knot at the end of two ropes to prevent the straw bale from loosening. The bundled straw bale with high density is convenient to transport and store, and is beneficial to comprehensive utilization of biomass energy like straw.

At present, D-knotter and C-knotter are widely used in the rectangular bale baler. In the world, some manufacturers of rectangular bale baler have mature design and manufacture technology of knotter and invention patent of knotter, such as CLAAS company and Rasspe Systemtechnik company in Germany, and John Deer company in the United States. The buyout of patent right of European patent named for EP1532859(A1) is implemented by John Deer company, which involves a single knot type of D-knotter invented by Rotole David Vincent. European patent number EP1745691 (A1) invented by Schumacher Friedrich-Wilhelm improved C-knotter. In China, the manufacturers of the rectangular bale baler heavily rely on imparting above-mentioned knotter to produce the rectangular bale baler, which leads to hold at high price of the knotter and almost monopolizes the market of the rectangular bale baler. In addition, these knotters belong to integrated device, which have the features of complex spatial structure, large manufacture difficulty, and high requirements of assembly accuracy. Moreover, it is a shortcoming that it needs to replace the entire knotter if a part is broken.

Chinese patent number 201110001685.8 K named for anthropopathic double-fingered knotter was invented on the basis of the improvement of D-knotter, which may be installed on the main shaft of the after body of the rectangular bale baler. The anthropopathic double-fingered knotter can simulate double fingers of hand to grip the rope carried by the rope-conveying mechanism, and finish several motions including rope-overlapping, knot-winding, rope-hooking, rope-cutting and knot-tripping. Finally, the anthropopathic double-fingered knotter realizes automatic bundling and knotting of the compacted straw bale. The anthropopathic double-fingered knotter improves the shortcoming of difficult manufacture of the knotter rack, and has simple spatial structure and low cost of manufacture, compared with the other D-knotter.

However, in existing techniques, the knotting driven bevel gear and the rope-gripping driving incomplete bevel gear are devised in the same side of the compound fluted disc of D-knotter, which makes D-knotter have uneven loading, complex space structure, large manufacture difficulty, and high requirements of assembly accuracy; Moreover, the rope can't be directly feed into the rope-gripping groove by the rope-conveying mechanism and the rope head is close to the knifepoint of the rope-cutting knife, so that it is bad for the rope-cutting knife on the cutter arm to cut off the rope; In addition, the point contact between spherical cutter area roller and the grooved cam on the large fluted disc leads to high stress impact in use, which causes heavy abrasion of the grooved cam in long-term use and decreases the service life of the knotter.

Therefore, the knotter driven by double fluted disc was proposed by this patent, and is a kind of automatic knotting device which uses the rope to bundle crop straw or herbage with the shape of rectangular bale. The knotter driven by double fluted disc has the advantages of reasonable structure, easy processing, low cost of manufacturing and reliable knotting, and may solve the problem of subjecting to the imported knotter in the manufacture of the rectangular bale baler in China.

SUMMARY OF THE INVENTION

The technical problems solved by the invention include:
1. Uneven loading of the compound fluted disc causes complex space structure of D-knotter, large manufacture difficulty of D-knotter, and high requirements of assembly accuracy of D-knotter.
2. The rope can't be directly feed into the rope-gripping groove by the rope-conveying mechanism and the rope head is close to the knifepoint of the rope-cutting knife, so that it is bad for the rope-cutting knife on the cutter arm to cut off the rope.
3. Heavy abrasion of the grooved cam influences the service life of the knotter.

The propose of the invention is to provide a kind of knotter driven by double fluted disc with the features of novel structure and low-cost manufacture, and overcome the shortcomings of complex space structure, large manufacture difficulty, and high requirements of assembly accuracy of D-knotter. The invention has the features of reasonable structure, easy processing and assembling, low cost of manufacturing and reliable knotting.

The technical proposal of the invention is described as following:

The compound fluted disc of D-knotter is divided into a small fluted disc (1) and a large fluted disc (3) which are set up in the described knotter driven by double fluted disc. The small fluted disc (1) drives the rope-gripping driven bevel gear (19), and the large fluted disc (3) drives the knotting driven bevel gear (9) and the cutter arm (7). The invention comprises a small fluted disc (1), a knotter rack (2), a large fluted disc (3), a cutter arm (7) installed on knotter rack (2), a knotter jaw and bill hook combined mechanism (R), a rope gripper driving mechanism (Q) and a rope gripper (J). The described small fluted disc (1) and large fluted disc (3) are coaxially fixed on the both sides of main shaft hole of blotter rack (201). The described knotter jaw and bill hook combined mechanism (R) and the rope gripper driving mechanism (Q) are installed on both sides of the knotter rack (2) respectively. The knotting driving incomplete bevel gear (5) is set up on the outer circumference of the described large fluted disc (3). The cutter arm roller (6) installed on the end of cutter arm (7) matches up with the grooved cam (4) distributed on the inner side of the described large fluted disc (3). The knotting driven bevel gear (9) meshes with the knotting driving incomplete bevel gear (5). The rope-gripping driving incomplete bevel gear (20) is set up on the outer circumference of the described small fluted disc (1), and the rope-gripping driven bevel gear (19) meshes with the rope-gripping driving incomplete bevel gear (20).

The described rope gripper driving mechanism (Q) drives the rope gripper (J). Three rope-gripping grooves (24) are evenly distributed along the outer edge of the rope-gripping plate (16) in the described rope gripper (J). The thread number of the involute worm (25) fixed to the edge of worm shaft (18) is 2, and the rope-gripping driven bevel mar (19) is fixed to another edge of the worm shaft (18). The teeth number of the spiral gear (26) meshing with the involute worm, gear (25) is 6. The transmission ratio of the involute worm gear (25) and the spiral gear (26) is 3.

The outline of the described cutter arm roller (6) is cylinder, and the described surface of the grooved cam (4) is space curved surface. Line contact is formed between cylinder surface of the cutter arm roller (6) and space curved surface of the grooved cam (4), and the cutter arm roller (6) rolls along space curved surface of the grooved cam (4). Both ends of the described cutter arm roller (6) have a circular arc chamfering.

The described knotter jaw and bill hook combined mechanism (R) matches with the cylinder cam (12) on the knotter rack (2), and the contour of the cylinder cam (12) is Archimedes spiral.

Theoretic contour of space curved surface of the described grooved cam (4) is an enveloping surface as described below in the line of P point and Q point in the static coordinate system $O_{-xyz}$. The establishing processes of the described space theoretic contour curved surface are as follows:

Assumed that the center point of the upper surface of the cutter arm roller (6) is marked with P, and the center point of the lower surface of the cutter arm roller (6) is marked with Q. The vertical line $PO_1$ is derived from the center point P of the upper surface of the cutter arm roller (6) to the axis line of cutter arm shaft (8) along the direction of rotational central shaft of the large fluted disc (3). Their intersection point is regarded as $O_1$, which is the center of the dynamic coordinate system. The dynamic coordinate system is established and represented as $O_1$-$x_1 y_1 z_1$ according to the right-hand rule, its $x_1$ axis is along, the direction of the vertical line $PO_1$, and its $y_1$ axis is defined as the swing central axis of the cutter arm roller (6). The vertical line is set up through the point $O_1$, which is perpendicular to rotational center shaft of the large fluted disc (3). Their vertical intersection is the center of the static coordinate system, which is marked with point O. In the static coordinate system, its x axis is parallel to $x_1$ axis, and its v axis is parallel to $y_1$ axis. The static coordinate system is also represented as O-xyz according to the right-hand rule. In the initial position, the dynamic coordinate system may be obtained by translating the static coordinate system m length unit along the negative direction of z axis and n length unit along the negative direction of y axis.

Assumed that the angle between the line $PO_1$ and the $x_1$ axis is $\theta_0$ degree, and the swing angle of the cutter arm is $\theta$ degree in the initial position; the length of the line $PO_1$ is l, and the distance between point P and point Q is f. In the dynamic coordinate system, the coordinate of point P and point Q may be expressed as (l cos ($\theta+\theta_0$), -l sin ($\theta+\theta_0$), 0) and ((l-f) cos ($\theta+\theta_0$), -(l-f) sin ($\theta+\theta_0$), 0) respectively.

Assumed that the angle $\beta$ is the rotation angle between the dynamic coordinate system and the static coordinate system around x axis in clockwise at any time. The coordinate of any point between the static coordinate system and the dynamic coordinate system may be derived from below transformation relation $$\begin{bmatrix} x \\ y \\ z \\ 1 \end{bmatrix} = \begin{bmatrix} 1 & 0 & 0 & 0 \\ 0 & 1 & 0 & -n \\ 0 & 0 & 1 & -m \\ 0 & 0 & 0 & 1 \end{bmatrix} \begin{bmatrix} 1 & 0 & 0 & 0 \\ 0 & \cos\beta & -\sin\beta & 0 \\ 0 & \sin\beta & \cos\beta & 0 \\ 0 & 0 & 0 & 1 \end{bmatrix} \begin{bmatrix} 1 & 0 & 0 & 0 \\ 0 & 1 & 0 & n \\ 0 & 0 & 1 & m \\ 0 & 0 & 0 & 1 \end{bmatrix}$$

$$\begin{bmatrix} x1 \\ y1 \\ z1 \\ 1 \end{bmatrix} = \begin{bmatrix} x1 \\ (y1+n)\cos\beta - (z1+m)\sin\beta - n \\ (y1+n)\sin\beta + (z1+m)\cos\beta - m \\ 1 \end{bmatrix}.$$

Where, x1, y1 and z1 are three coordinates of any point in the dynamic coordinate system, and x, y and z are three coordinates of any point in the static coordinate system. Thus, the homogeneous coordinates of point P in the static coordinate system may be expressed as $$\begin{bmatrix} l\cos(\theta - \theta_0) \\ -l\sin(\theta - \theta_0)\cos\beta + n\cos\beta - m\sin\beta - n \\ -l\sin(\theta - \theta_0)\sin\beta + n\sin\beta + m\cos\beta - m \\ 1 \end{bmatrix}.$$

In the same way, the homogeneous coordinates of point Q in the static coordinate system may be expressed as $$\begin{bmatrix} (l-f)\cos(\theta - \theta_0) \\ -(l-f)\sin(\theta - \theta_0)\cos\beta + n\cos\beta - m\sin\beta - n \\ -(l-f)\sin(\theta - \theta_0)\sin\beta + n\sin\beta + m\cos\beta - m \\ 1 \end{bmatrix}.$$

Where, the turning angle $\theta$ of the cutter arm (7) at rise travel phase [0, $\pi/3$] of the grooved cam (4) may be determined by $$\theta = -\frac{\theta_1}{2\pi}\sin\left[\frac{2\pi(\beta - \varphi)}{\phi - \varphi}\right] + \frac{\theta_1}{\phi - \varphi}(\beta - \varphi),$$

and the turning angle $\theta$ of the cutter arm (7) at return stroke phase [$\pi/3$, $2\pi/3$] of the grooved cam (4) may be determined by $$\theta = \theta_1 + \frac{\theta_1}{2\pi}\sin\left[\frac{2\pi(\beta - \Phi)}{\omega}\right] - \frac{\theta_1}{\omega}(\beta - \Phi)$$

Where, $\theta_1$ is the maximum swing angle of the cutter arm (7), $\varphi$ is starting phase angle of the grooved cam (4) at rise travel, $\Phi$ is ending phase angle of the grooved cam (4) at rise travel, and $\omega$ is ending phase angle of the grooved cam (4) at return stroke.

The nut boss (2501) is set up at the end of the described involute worm (25).

The described knotter rack (2) also comprises the worm shaft hole (203), the knotter jaw axle hole (204) and the rope-gripping plate axle hole (205). The knotter jaw axle hole (204) and main shaft hole of knotter rack (201) are set up with the type of non-orthogonal intersecting axis. The worm shaft hole (203) is perpendicular to main shaft hole of knotter rack (201). The cutter arm shaft hole (202) is perpendicular in space to the knotter jaw axle hole (204). The rope-gripping plate axle hole (205) is perpendicular to main shalt hole of knotter rack (201).

The shaft angle between axial lead d of knotter jaw axle hole (204) and axial lead c of main shaft hole of knotter rack (201) is 98 degrees, the shaft angle between axial lead d of knotter jaw axle hole (204) and axial lead c of worm shaft hole (203) is 30 degrees, and the shaft angle between axial, lead e of rope-gripping plate axle hole (205) and axial lead c of worm shaft hole (203) is 72 degrees.

The described cutter arm (7) is hinged into the cutter arm shaft hole (202) by the cutter arm shaft (8). The cutter arm shaft (8) is sustained in the cutter arm shaft hole (202) by a pair of plain bearings (29) installed symmetrically and first thrust ball bearing (28). The both ends of the cutter arm shaft (8) are connected and fixed by bolts.

The bosses (209) are set up among the end surface of the rope-gripping plate (16), the end surface of the spiral gear (26) and the end surface of rope-gripping plate axle hole (205), or the second thrust ball bearing (31) is installed between the end surface of the described spiral gear (26) and the end surface of the described rope-gripping plate axle hole (205).

The beneficial effects of the invention are as follows:

1. The composite fluted disc (32) of D-knotter is divided into a small fluted disc (1) and a large fluted disc (3) which are set up in the described knotter driven by double tinted disc. The small fluted disc (1) and large fluted disc (3) are coaxially fixed an the both sides of main shaft hole of knotter rack (201), which improves the force balance of main shaft and the working stability of the described knotter.

2. The described knotter jaw and bill hook combined mechanism (R) and rope gripper driving mechanism (Q) are installed on both sides of the knotter rack (2), which fully utilizes the installation space of the knotter rack (2) and makes structure parameters matching of the knotter rack (2) more flexible and reasonable.

3. Three rope-gripping grooves (24) are evenly distributed along the outer edge of the rope-gripping plate (16), which results in that the rope can reach the middle position of the rope-cutting knife (15) when the rope-gripping plate (16) rotates from initial position to end position of rope-gripping, and the length of slip-cutting the rope can be prolonged and rope-cutting action of the knotter is more reliable.

4. The cutter arm roller (6) rolls along a spatial curved surface profile of the grooved cam (4) and forms line contact with it, so their bearing capacity can be enlarged and their wear can be reduced. At the same time, the spatial curved surface profile of the grooved cam (4) makes the cutter arm (7) swing with sine acceleration movement rule, which theoretically eliminates stress impact between cutter arm roller (6) and spatial curved surface of the grooved cam (4).

5. The axis line arrangement of the knotter rack (2) reduces the manufacture difficulty of axle holes on the knotter rack (2) and makes for ensuring processing precision of shaft angle among the axle holes.

6. The composite structure of sliding bearing and thrust ball bearing makes the end face of the cutter arm shaft hole (202) on the knotter rack (2) prevent friction from the end face of the axle hole on the cutter arm shaft (8), which both ensures strictly the installation position of the cutter arm (7) and makes cutter arm (7) rotate flexibly.

7. The nut boss (2501) is set up at the end of the described involute worm (25), which is greatly convenient for installing and dismantling the involute worm (25).

8. The bosses (209) are set up among the end surface of the rope-gripping plate (16), the end surface of the spiral gear (26) and the end surface of rope-gripping plate axle hole (205), which reduce frictions in the working process of the knotter and makes for transmission.

9. The thrust bearing, instead of the boss, is also installed, between the end surface of the spiral gear (26) and the rope-gripping plate axle hole (205), which has similar effect with the boss.

Figure 1:
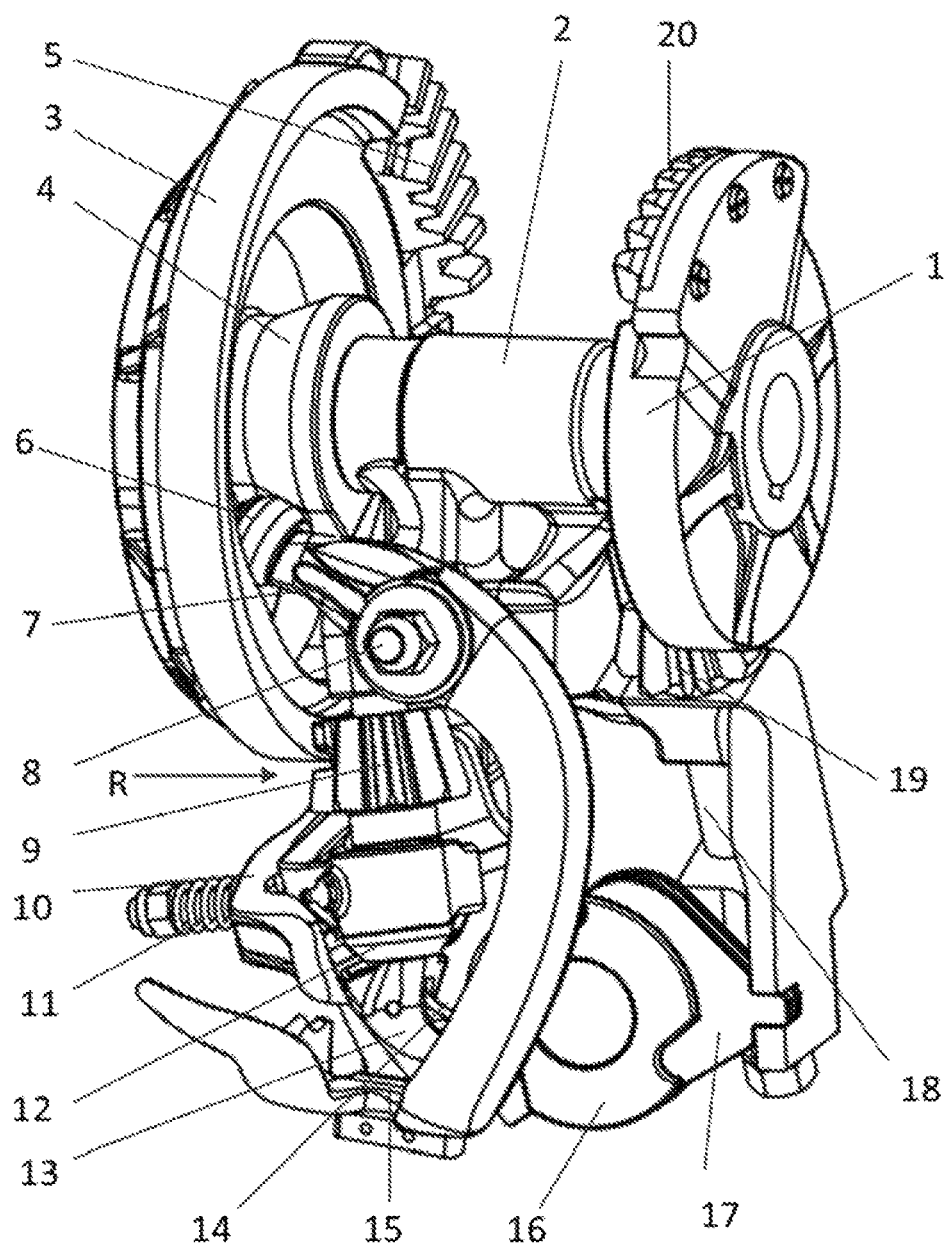
FIG. 1 is a forward axonometric drawing of the assembly of the knotter driven by double fluted disc in one embodiment.

In the figures, the label number indicates as follows:

1. Small fluted disc; 2. Knotter rack; 201. Main shaft hole of knotter rack; 202. Cutter arm shaft hole; 203. Worm shaft hole; 204. Knotter jaw axle hole; 205. Rope-gripping plate axle hole; 206. Swing shaft hole of rope-gripping moving plate; 207. Axle hole of pressure plate of bill hook; 208. Axle hole of pressure plate of rope-gripping moving plate; 209. Boss; 210. Stator bayonet; 3. Large fluted disc; 4. Grooved cam; 5. Knotting driving incomplete bevel gear; 6. Cutter arm roller; 7. Cutter arm; 8. cutter arm shaft; 9. Knotting driven bevel gear; 10. Pressure plate of bill hook; 1001. Pressure plate shaft of bill hook; 11. Compression spring; 12. Cylinder cam; 13. Knotter jaw; 14. Bill hook; 15. Rope-cutting knife; 16. Rope-gripping plate; 17. Rope-gripping stator; 18. Worm shaft; 19, Rope-gripping driven bevel gear; 20. Rope-gripping driving incomplete bevel gear; 21. Rope-gripping moving plate; 22. Pressure plate of rope-gripping moving plate; 23. Swing shaft of rope-gripping moving plate; 24. Rope-gripping groove; 25. Involute worm; 2501. Nut boss; 26, Spiral gear; 27. Rope-gripping plate shaft; 28. First thrust ball bearing; 29. Plain bearing; 30. Gap of cutter arm; 31. Second thrust ball bearing; 32. Composite fluted disc.

DESCRIPTION OF THE PREFERRED EMBODIMENTS

In the description of the invention, something need to be understood is that the orientation or position relationship indicated by the words as "up", "down", "front", "behind", "left", "right", "top", "bottom", "inside" and "outside" is the orientation or position relationship as shown in attached drawings, just to facilitate the description of the invention and simplify the description, instead of indicating or implying that the devices or components must have a specific orientation, construction and operation. Therefore, they cannot be understood as a limitation to the invention.

In addition, such terms as "first" and "second" are used just to describe the purpose and not to indicate or suggest the relative importance or imply the quantity of indicated technical features. Thus, the features defined by "first" or "second" can explicitly or implicitly include one or more of the features. In the description of the utility model, the meaning of multiple is two or more than two, unless otherwise specifically specified.

In the invention, such terms as "install", "link" and "connect" and "fix" should be understood broadly, unless otherwise specifically stipulated and specified. For example, the "connect" may be fixed connection, dismountable connection or integrated connection; It may be a mechanical connection, and can also be electrical connection; It may be direct connection, and can also be indirect connection by an intermediate medium, and also can be internal connection of two components. For ordinary technical personnel in the field, the specific meaning of the above terms can be understood according to the specific situations.

In the invention, unless otherwise specifically stipulated and specified, the first feature "above" or "below" the second features may include the direct contact of the first and second features, and may also include that the first and second features are not direct contact but a contact by other features between both. Furthermore, the first feature "above", "top" or "up" the second feature includes that the first feature is right above or inclined above the second feature, or only indicates that the horizontal height of the first feature is higher than the second feature. The first feature "below", "beneath", and "under" the second feature includes that the first feature is under or inclined below the second feature, or only indicate that the horizontal height of the first feature is less than the second feature.

Combined with all attached figures, the further details of the patent are illustrated, but the protection scope of the invention is not limited to that.

Figure 7:
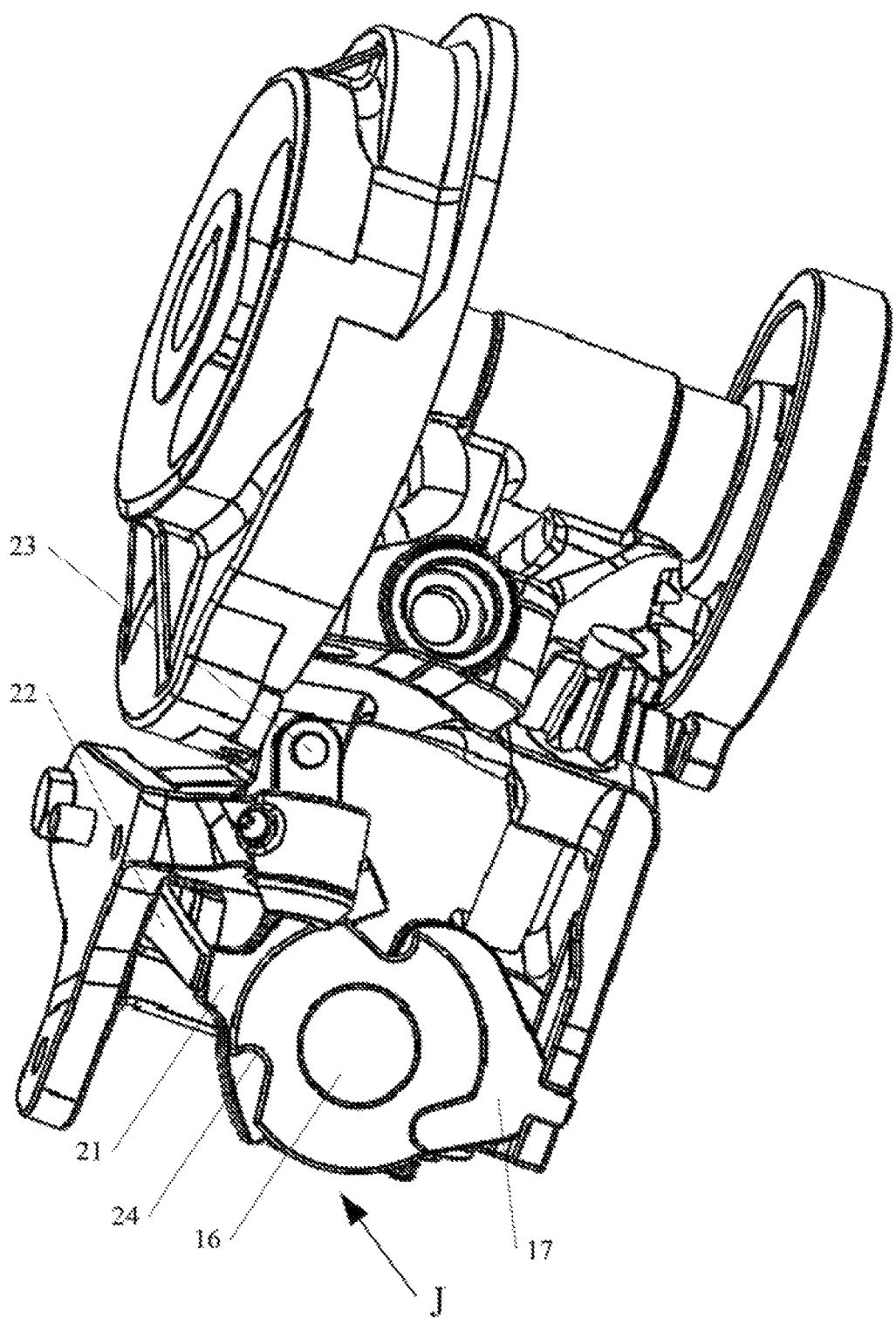
FIG. 7 is the axonometric drawing of the structure of rope gripper (J) in one embodiment.
Figure 8:
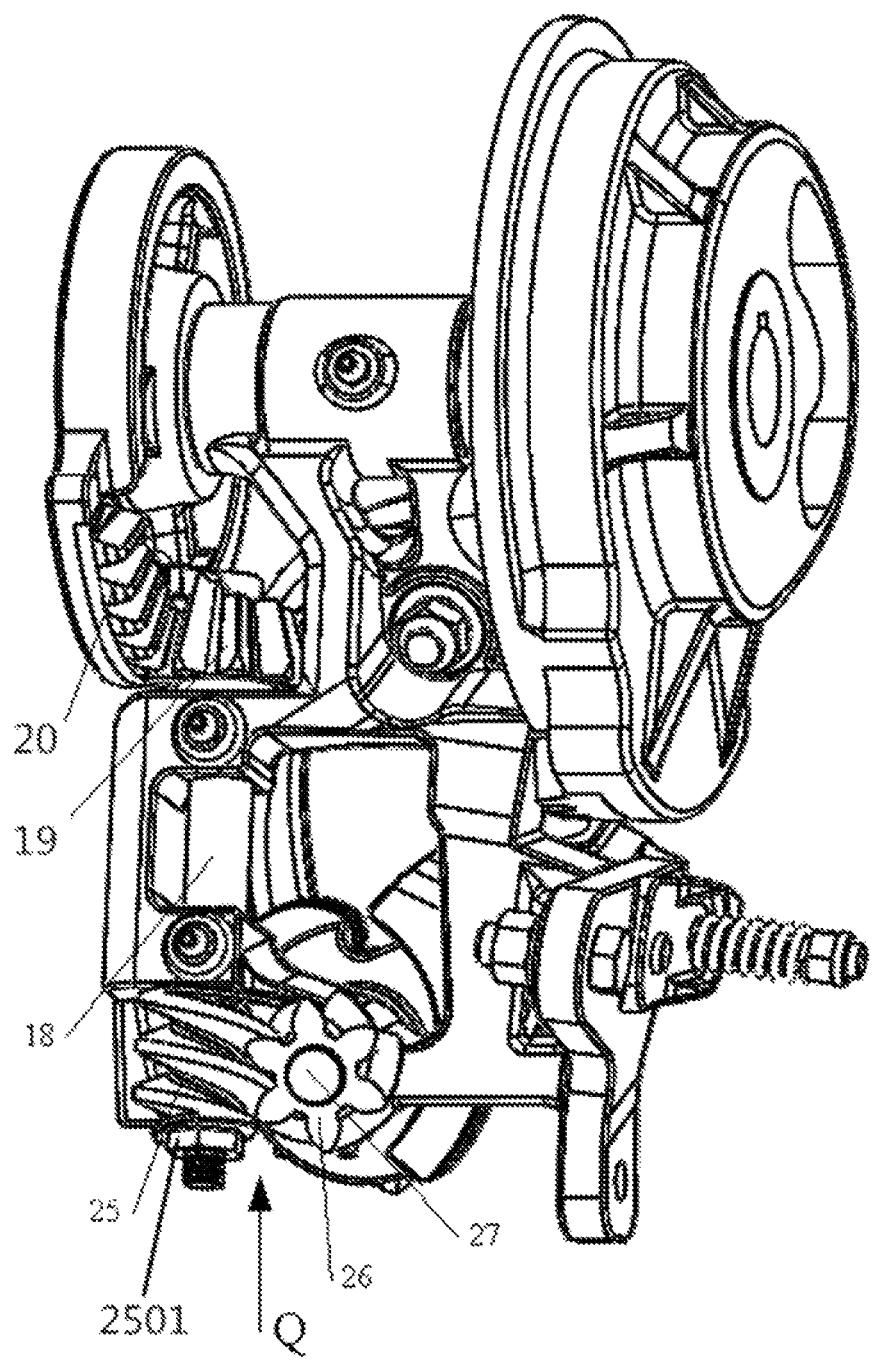
FIG. 8 is the axonometric drawing of the rope gripper driving mechanism (Q) in one embodiment.

As shown in FIG. 1 FIG. 7 and FIG. 8, the described knotter driven by double fluted disc comprises a small fluted disc (1), a knotter rack (2), a large fluted disc (3), a cutter arm (7) installed on the knotter rack (2), a knotter jaw and bill hook combined mechanism (R), rope gripper (J) and a rope gripper driving mechanism (Q). The described small fluted disc (1) and large fluted disc (3) are coaxially fixed on the both sides of main shaft hole of knotter rack (201). The described knotter jaw and bill hook combined mechanism (R) and the rope gripper driving mechanism (Q) are installed on both sides of the knotter rack (2). The knotting driving incomplete bevel gear (5) is arranged on the outer circumference of the described large fluted disc (3), and the knotting driven bevel gear (9) is fixed with the bill hook combined mechanism (R). The knotting driven bevel gear (9) meshes with the knotting driving incomplete bevel gear (5).

As shown in FIG. 1, FIG. 3, FIG. 4 and FIG. 12, the described cutter arm (7) is hinged into the cutter arm shaft hole (202) on the knotter rack (2) by the cutter arm shaft (8). The grooved cam (4) is arranged in the inner of the large fluted disc (3), and the cutter arm roller (6) matches up with the grooved cant (4).

Figure 3:
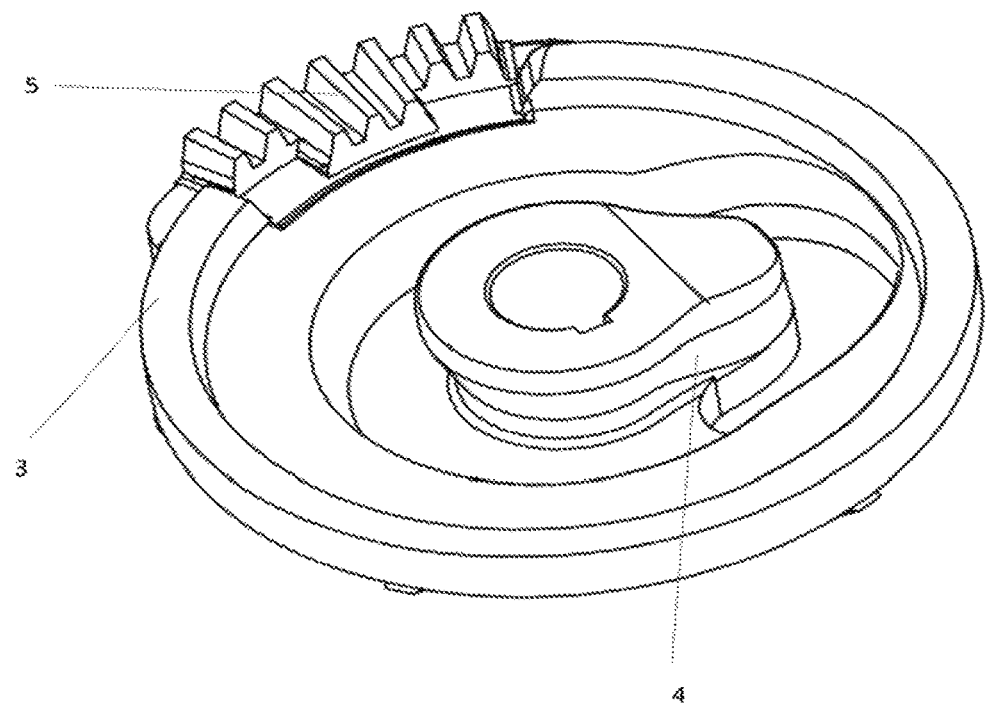
FIG. 3 is the structure layout drawing of the large fluted disc (3) in one embodiment.
Figure 20:
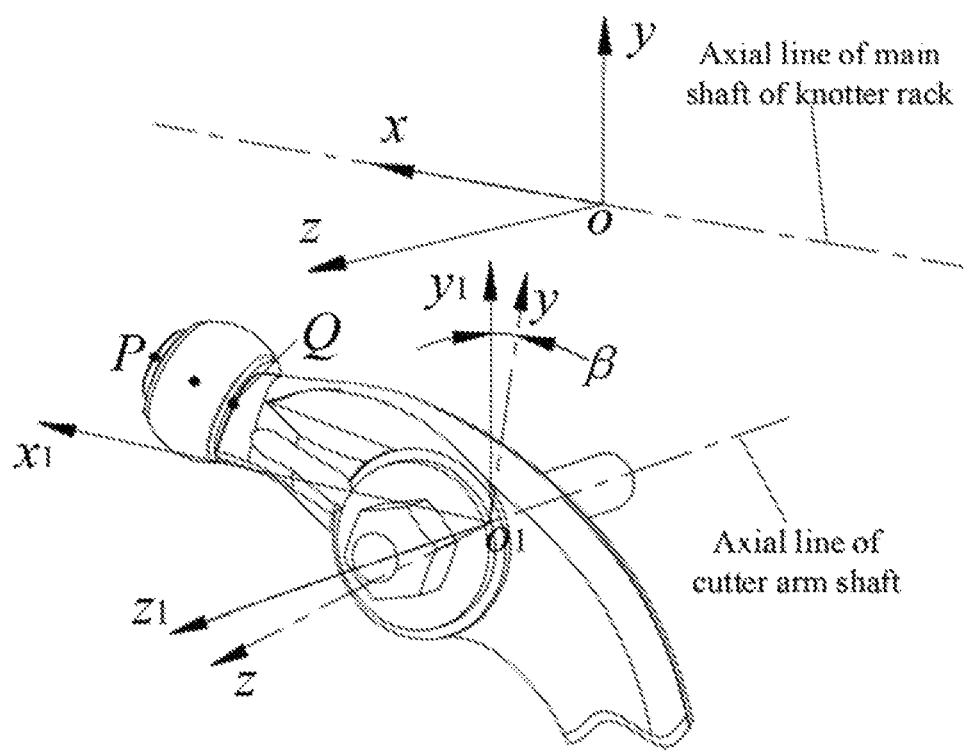
FIG. 20 is the coordinate system of establishing space theoretic contour curved surface of the grooved cam (4).

As shown in FIG. 3 and FIG. 20, the described grooved cam (4) has space contour curved surface, which is an enveloping surface as described below in the line of P point and Q point in the static coordinate system $O_{-xyz}$. The establishing processes of the described space theoretic contour cursed surface are as follows:

Assumed that the center point of the upper surface of the cutter arm roller (6) is marked with P, and the center point of the lower surface oldie cutter arm roller (6) is marked with is Q. The vertical line $PO_1$ is derived from the center point P of the upper surface of the cutter arm roller (6) to the axis line of cutter arm shaft (8) along the direction of rotational central shaft of the large fluted disc (3). Their intersection point is regarded as $O_1$, which is the center of the dynamic coordinate system. The dynamic coordinate system is established and represented as $O_1$-$x_1y_1z_1$ according to the right-hand rule, its $x_1$ axis is along the direction of the vertical line $PO_1$, and its $y_1$ axis is defined as the swing central axis of the cutter arm roller (6). The vertical line is set up through the point $O_1$, which is perpendicular to rotational center shaft of the large fluted disc (3). Their vertical intersection is the center of the static coordinate system, which is marked with, point O. In the static coordinate system, its x axis is parallel to $x_1$ axis, and its y axis is parallel to $y_1$ axis. The static coordinate system is also represented as O-xyz according to the right-hand rule. In the initial position, the dynamic coordinate system may be obtained by translating the static coordinate system 22 mm along the negative direction of z axis and 58 mm along the negative direction of y axis. Assumed that the angle between the line $PO_1$ and the $x_1$ axis is $\theta_0$ degree in the initial position, and the value of $\theta_0$ is $5\pi/36$; the swing angle oldie cutter arm is θ degree in the initial position; the length of the line $PO_1$ is 1, and the value of 1 is 64 mm; the distance between point P and point Q is f, and the value of f is 17 mm. Therefore, the coordinate of point P and point Q in the dynamic coordinate system may be expressed as (64 cos(θ+ 5π/36), −64 sin(θ+5π/36), 0) and (47 cos(θ+5π/36), −47 sin(θ+5π/36), 0) respectively.

Assumed that the angle β is the rotation angle between the dynamic coordinate system and the static coordinate system around x axis in clockwise at any time. The coordinate of any point between the static coordinate system and the dynamic coordinate system may be derived from below transformation relation $$\begin{bmatrix} x \\ y \\ z \\ 1 \end{bmatrix} = \begin{bmatrix} 1 & 0 & 0 & 0 \\ 0 & 1 & 0 & -n \\ 0 & 0 & 1 & -m \\ 0 & 0 & 0 & 1 \end{bmatrix} \begin{bmatrix} 1 & 0 & 0 & 0 \\ 0 & \cos\beta & -\sin\beta & 0 \\ 0 & \sin\beta & \cos\beta & 0 \\ 0 & 0 & 0 & 1 \end{bmatrix} \begin{bmatrix} 1 & 0 & 0 & 0 \\ 0 & 1 & 0 & n \\ 0 & 0 & 1 & m \\ 0 & 0 & 0 & 1 \end{bmatrix}$$

-continued $$\begin{bmatrix} x1 \\ y1 \\ z1 \\ 1 \end{bmatrix} = \begin{bmatrix} x1 \\ (y1+n)\cos\beta - (z1+m)\sin\beta - n \\ (y1+n)\sin\beta + (z1+m)\cos\beta - m \\ 1 \end{bmatrix}.$$

Where, x1, y1 and z1 are three coordinates of any point in the dynamic coordinate system, and x, y and z are three coordinates of any point in the static coordinate system. Thus, the homogeneous coordinates of point P in the static coordinate system may be expressed as $$\begin{bmatrix} l\cos(\theta - \theta_0) \\ -l\sin(\theta - \theta_0)\cos\beta + n\cos\beta - m\sin\beta - n \\ -l\sin(\theta - \theta_0)\sin\beta + n\sin\beta + m\cos\beta - m \\ 1 \end{bmatrix}.$$

In the same way, the homogeneous coordinates of point Q in the static coordinate system may be expressed as $$\begin{bmatrix} (l-f)\cos(\theta - \theta_0) \\ -(l-f)\sin(\theta - \theta_0)\cos\beta + n\cos\beta - m\sin\beta - n \\ -(l-f)\sin(\theta - \theta_0)\sin\beta + n\sin\beta + m\cos\beta - m \\ 1 \end{bmatrix}.$$

Where, the turning angle θ of the cutter arm (7) at rise travel phase [0, π/3] of the grooved cam (4) may be determined by $$\theta = -\frac{\theta_1}{2\pi}\sin\left[\frac{2\pi(\beta - \varphi)}{\phi - \varphi}\right] + \frac{\theta_1}{\phi - \varphi}(\beta - \varphi),$$

and the turning angle θ of the cutter arm (7) at return stroke phase [π/3, 2π/3] of the grooved cam (4) may be determined by $$\theta = \theta_1 + \frac{\theta_1}{2\pi}\sin\left[\frac{2\pi(\beta - \Phi)}{\omega}\right] - \frac{\theta_1}{\omega}(\beta - \Phi)$$

Where, $\theta_1$ is the maximum swing angle of the cutter arm (7), φ is starting phase angle of the grooved cam (4) at rise travel, Φ is ending phase angle of the grooved cam (4) at rise travel, and ω is ending phase angle of the grooved cam (4) at return stroke.

As shown in FIG. 3, actual contour of the grooved cam (4) is derived from above-mentioned theoretic contour of the grooved cam (4) according to the rule of normal-direction isometry.

Figure 2:
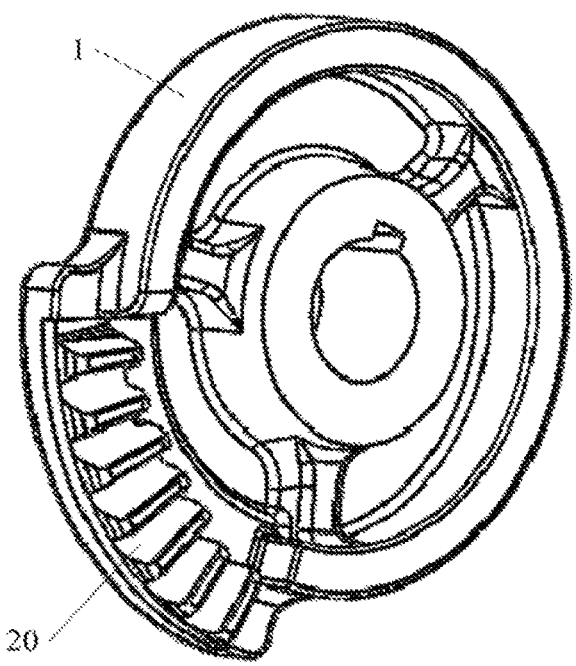
FIG. 2 is the structure layout drawing of the small fluted disc (1) in one embodiment.

As shown in FIG. 2 and FIG. 8, the rope-gripping driving incomplete bevel gear (20) is arranged on the outer circumference of the described small fluted disc (1), and the rope-gripping driven bevel gear (19) is fixed with the rope gripper driving mechanism (Q). The rope-gripping driven bevel gear (19) meshes with the rope-gripping driving incomplete bevel gear (20). The described rope gripper driving mechanism (Q) also comprises the spiral gear (26), and the spiral gear (26) is fixedly connected with the rope gripper (1) by the rope-gripping plate shall (27).

Figure 4:
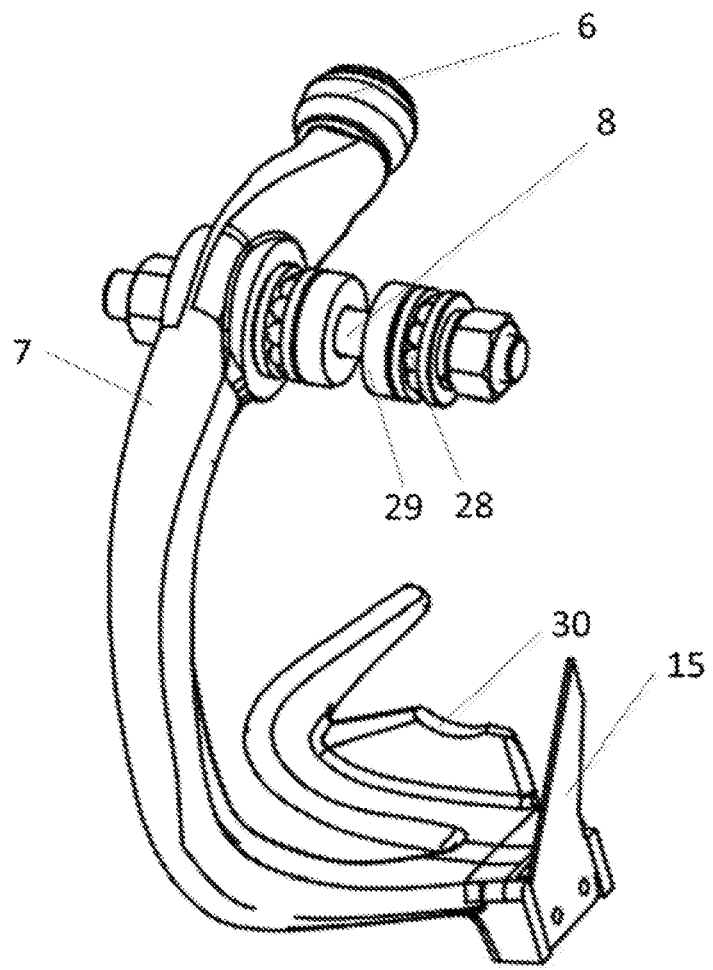
FIG. 4 is the structural schematic diagram of the cutter arm (7) in one embodiment.

As shown in FIG. 4 and FIG. 1, the described cutter arm (7) is hinged into the cutter arm shaft hole (202) on the knotter rack (2) by the cutter arm shaft (8). The described grooved cam (4) drives the cutter arm roller (6) and makes the described cutter arm (7) swing back and forth around the cutter arm shaft (8).

Figure 17:
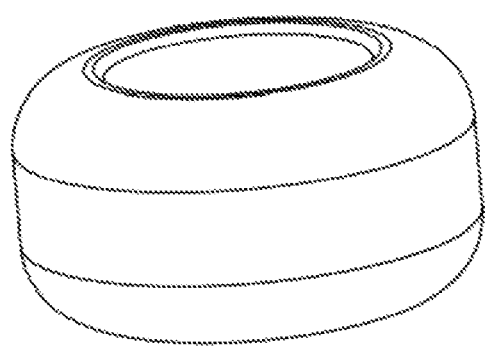
FIG. 17 is the structural schematic diagram of the cutter arm roller (6).

As shown in FIG. 4, the cutter arm roller (6) is cylindrical, and it rolls in the form of line contact along space contour curved surface of the grooved cam (4). As shown in FIG. 17, both ends of the cutter arm roller (6) have a circular arc chamfering, which are beneficial to reduce the assembly requirement of the cutter, arm roller (6) and the grooved cam (4), and decreases their wear.

Figure 5:
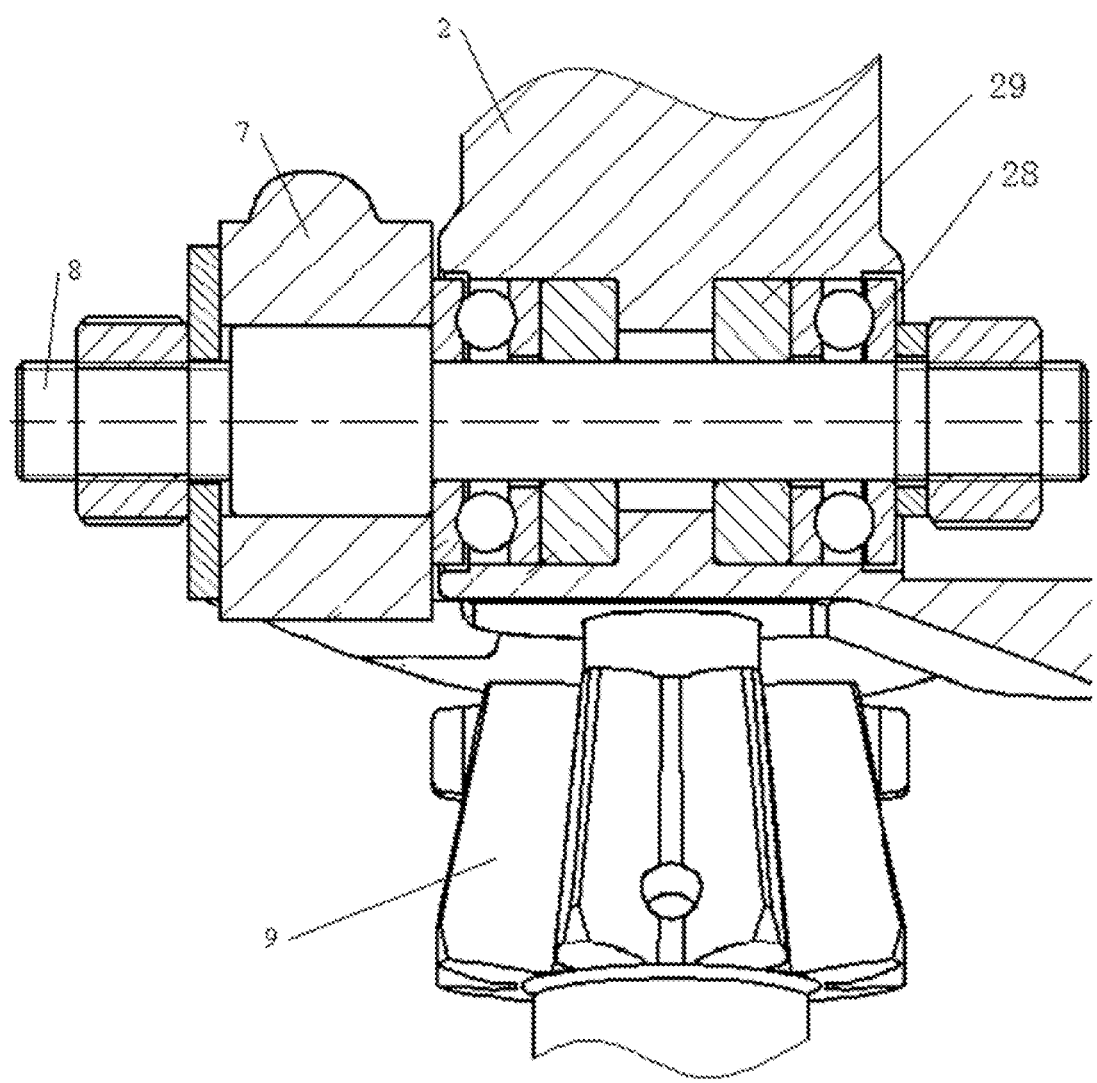
FIG. 5 is the 2D cutaway view of the assembly of cutter arm shaft (8) in one embodiment.
Figure 12:
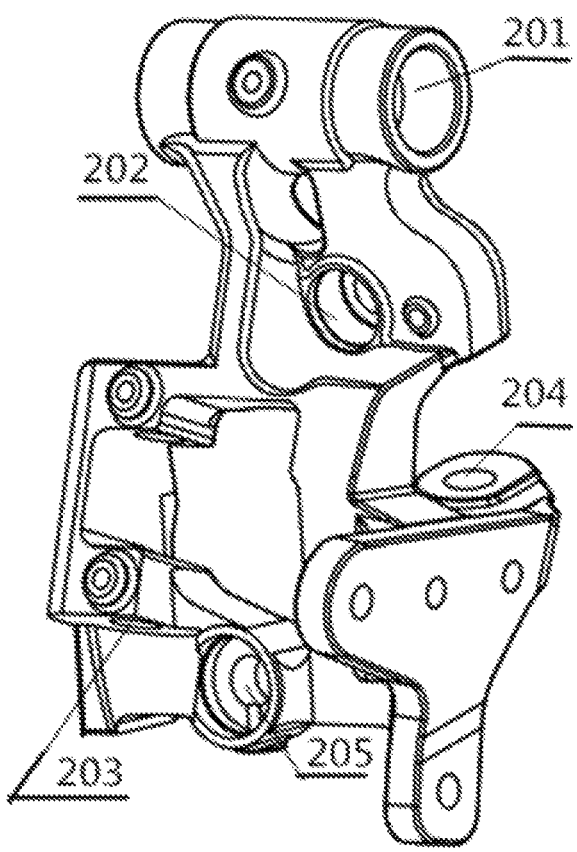
FIG. 12 is the schematic diagram a of axle holes of the knotter rack (2) in one embodiment.

As shown in FIG. 5 and FIG. 12, the cutter arm shaft (8) is sustained in the cutter arm shaft hole (202) with stepped shape by a pair of plain bearings (29) installed symmetrically and first thrust ball bearing (28). The both ends of the cutter arm shaft (8) are connected and fixed by bolts. So, the composite structure of plain bearing (29) and thrust ball bearing (28) makes the end face of the cutter arm shaft hole (202) prevent friction from the end face of the axle hole on the cutter arm shaft (8), which both ensures strictly the installation position of the cutter arm (7) and makes the cutter arm (7) rotate flexibly.

Figure 6:
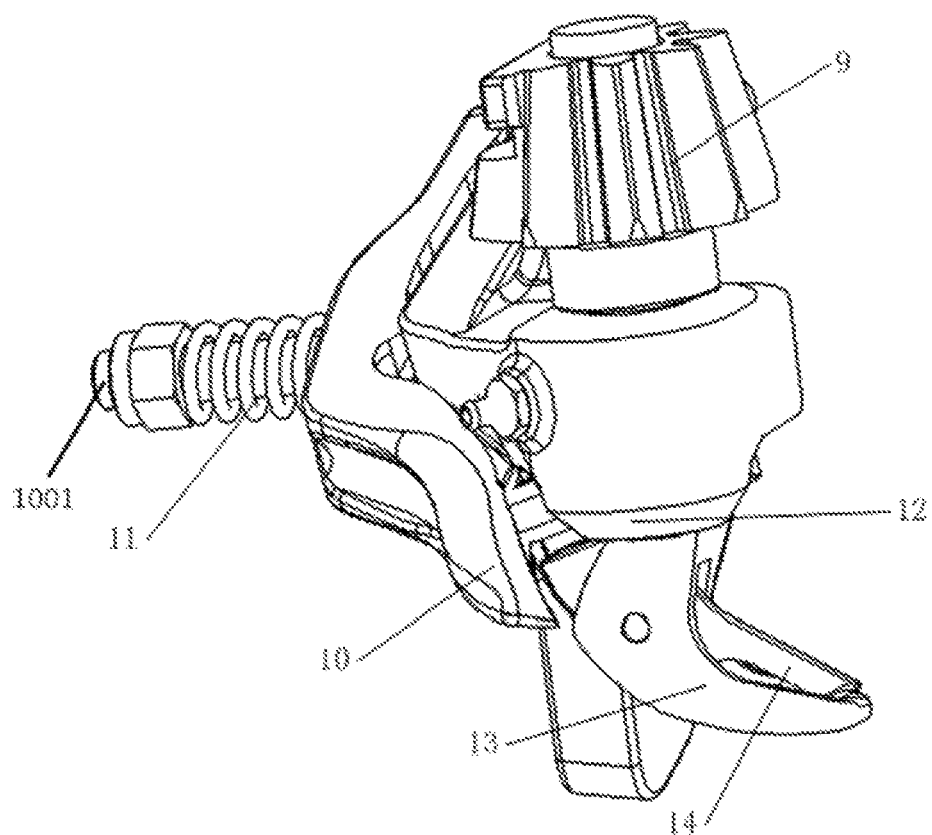
FIG. 6 is the structural schematic diagram of the knotter jaw and bill hook combined mechanism (R) in one embodiment.

As shown in FIG. 6, the described knotter jaw and bill hook combined mechanism (R) comprises a knotter jaw (13), a bill hook (14), a pressure plate of bill hook (10) and a cylinder cam (12) on the knotter rack (2). The center hole of the cylinder cam (12) is the knotter jaw axle hole (204) on the knotter rack (2). The axle head of the knotter jaw (13) is fixed with the knotting driven bevel gear (9) across the cylinder cam (12). The bill hook (14) is hinged into the knotter jaw axle hole (204) by a hinge pin. The axle head of the bill hook (14) is pressed by the pressure plate of bill hook (10). The pressure plate of bill hook (10) is hinged into the axle hole of pressure plate of bill hook (207) on the knotter rack (2) by a pressure plate shat of bill hook (1001). The pressure plate shaft of bill hook (1001) is sheathed the compression spring (11), and the end of the compression spring (11) is fixed by a bolt. So, the compression force imposed by the pressure plate of bill hook (10) may be adjusted. The contour of the cylinder cam (12) is Archimedes spiral, and matches up with the roller fastened to the axle head of the bill hook (14). When the knotter jaw (13) rotates a circle, the bill hook (14) will open and close under the control of the cylinder cam (12), and finishes the action of rope-hooking.

As shown in FIG. 7, the described rope gripper (J) comprises a rope-gripping plate (16), two rope-gripping stators (17), a rope-gripping moving plate (21) and a pressure plate of rope-gripping moving plate (22). The described two rope-gripping stators (17) are stuck in the stator bayonet (210) on the knotter rack (2). The rope-gripping moving plate (21) is hinged into the swing shaft hole of rope-gripping moving plate (206) by the swing shaft of rope-gripping moving plate (23). The backside of the rope-gripping moving plate (21) is pressed by the pressure plate of rope-gripping moving plate (22). The pressure plate of rope-gripping moving plate (22) is hinged into the axle hole of pressure plate of rope-gripping moving plate (208) on the knotter rack (2) by a hinge pin. When the rope-gripping plate (16) rotates, the rope-gripping moving plate (21) may swing around the swing shall of rope-gripping moving plate (23).

As shown in FIG. 8, the described rope gripper driving mechanism (Q) also comprises an involute worm (25) and a spiral gear (26). The rope-gripping driven bevel gear (19) and the involute worm (25) are fixed on both sides of the worm shaft (18) respectively. The spiral gear (26) and the rope-gripping plate (16) are fixed by the rope-gripping plate shaft (27). The involute worm (25) meshes with the spiral gear (26). The nut boss (2501) is set up at the end of the involute worm (25), which is greatly convenient installing and dismantling the involute worm (25).

Figure 9:
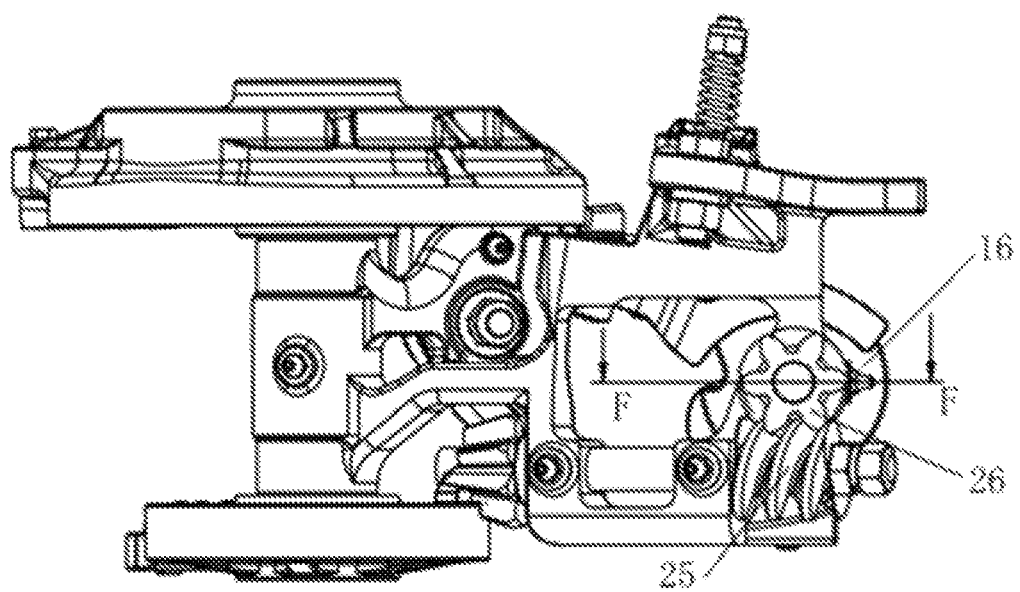
FIG. 9 is the assembling drawings of the knotter driven by doubled disc in one embodiment.
Figure 10:
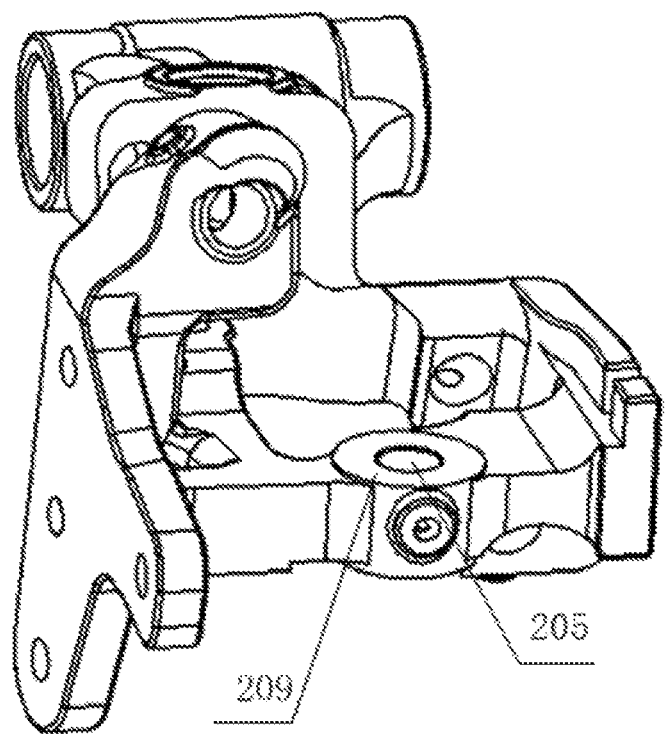
FIG. 10 is the schematic diagram of nut boss of the rope-gripping plate (16) in one embodiment.
Figure 11:
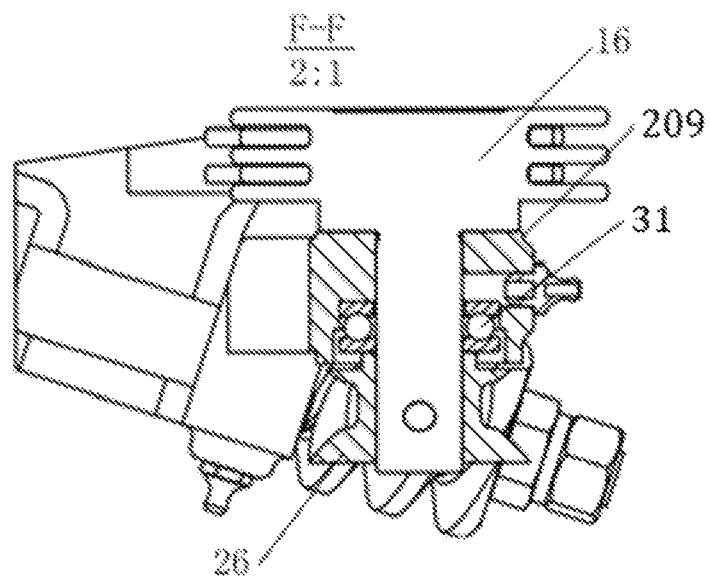
FIG. 11 is the cutaway view along F-F direction in FIG. 9.

As shown in FIG. 9 and FIG. 10, the bosses (209) are set up among the end surface of the rope-gripping plate (16), the end surface of the spiral gear (26) and the end surface of rope-gripping plate axle hole (205), which reduce frictions in the working process of the described knotter and makes for transmission. The second thrust ball bearing (31) may also be installed between the spiral gear (26) and the rope-gripping plate shaft hole (205), instead of the boss (209), as shown in FIG. 11.

As shown in FIG. 1 and FIG. 8, the knotter jaw (13) will be driven to wind the rope when the knotting driven bevel gear (9) meshes with the knotting driving incomplete bevel gear (5). At the same time, the bill hook (14) opens and closes to hook the rope under the control of the cylinder cam (12). The involute worm (25) drives the spiral gear (26) to rotate when the rope-gripping driven bevel gear (19) meshes with the rope-gripping driving incomplete bevel gear (20), and the rope-gripping plate (16) fixed with the spiral gear (26) is driven to rotate. The described knotter jaw and bill hook combined mechanism (R) and rope gripper driving mechanism (Q) are installed on both sides of the knotter rack (2), which fully utilizes the installation space of the knotter rack (2) and makes structure parameters matching of the knotter rack (2) more flexible. The transmission ratio of the involute worm gear (25) and the spiral gear (26) is 3. The thread number of the optimized described involute worm (25) is 2, and the teeth number of the described spiral gear (26) is 6. Three grooves of rope-gripping plate (24) are evenly distributed along the edge of the rope-gripping plate (16), in each cycle of knotting, when the described small fluted disc (1) rotates a cycle, three grooves (24) of rope-gripping plate (16) will rotate 120 degrees by the rope gripper driving mechanism (Q). So, the rope can reach the middle position of the rope-cutting knife (15) when the rope-gripping plate (16) rotates from initial position to end position of rope-gripping, and the length of slip-cutting the rope can be prolonged and rope-cutting action of the knotter becomes more reliable.

Figure 13:
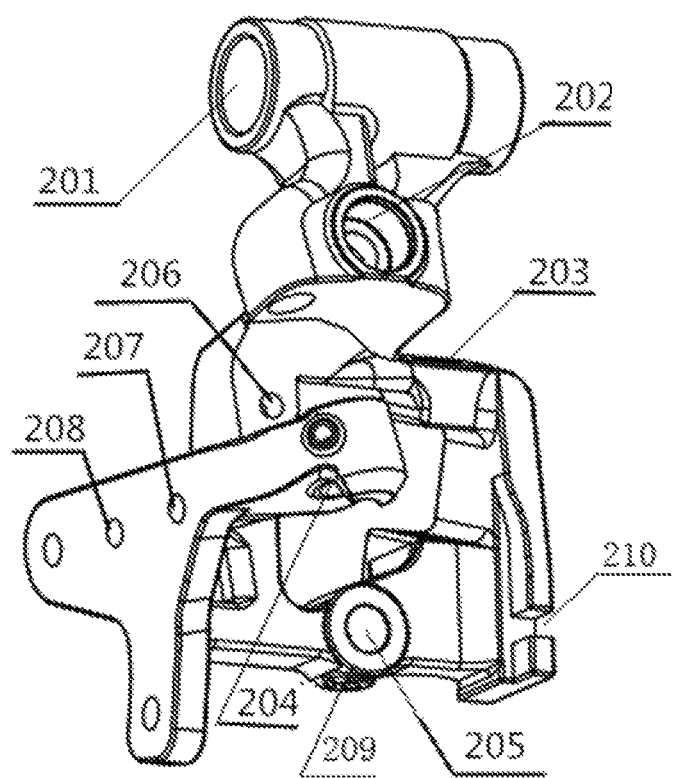
FIG. 13 is the schematic diagram b of axle holes of the knotter rack (2) in one embodiment.
Figure 14:
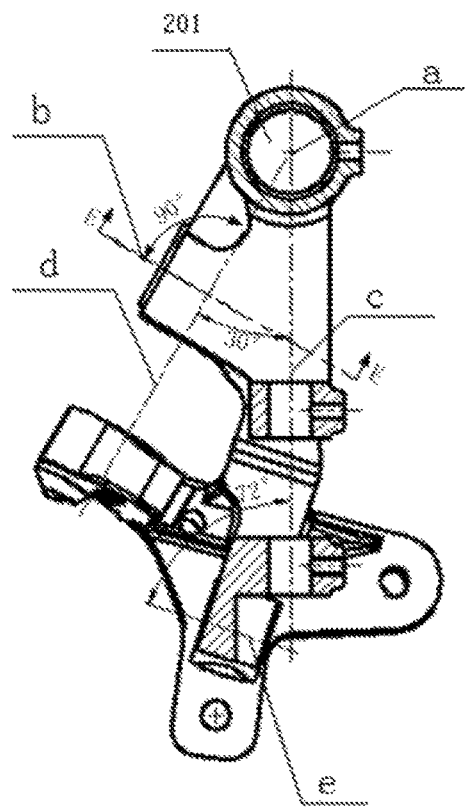
FIG. 14 is the angle relation diagram a of axle holes of the knotter rack (2) in one embodiment.
Figure 15:
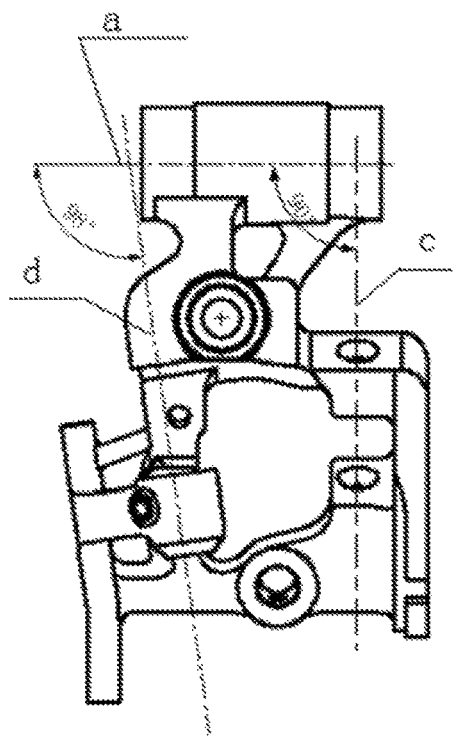
FIG. 15 is the angle relation diagram b of axle holes of the blotter rack (2) in one embodiment.
Figure 16:
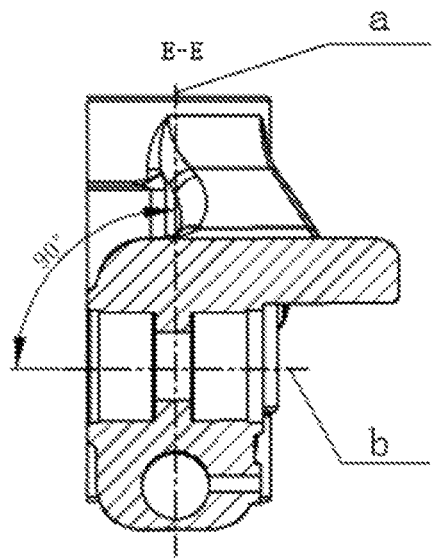
FIG. 16 is the angle relation diagram c of axle holes of the knotter rack (2) in one embodiment.

As shown FIG. 12 and FIG. 13, the described knotter rack (2) also comprises main shaft hole of knotter rack (201), the cutter arm shaft hole (202), the worm shaft hole (203), the knotter jaw axle hole (204) and the rope-gripping plate axle hole (205). In order to reduce the manufacture difficulty of above-mentioned axle holes on the knotter rack (2) and ensure processing precision of the axle holes, axial lead d of the knotter jaw axle hole (204) and axial lead a of main shall hole of knotter rack (201) are set up with the type of non-orthogonal intersecting axis. Axial lead c of the worm shaft hole (203) is perpendicular to axial lead a of main shaft hole of knotter rack (201). Axial lead b of the cutter arm shaft hole (202) is vertical in space with axial lead d of the knotter jaw axle hole (204). Axial lead b of the cutter arm shalt hole (202) and axial lead e of the rope-gripping plate axle hole (205) is perpendicular in space to axial lead of main shaft hole of knotter rack (201). The head face of main shalt hole of knotter rack (201) is regarded as projection plane of a main view, and angle relation of the axle holes on the knotter rack (2) is shown in FIG. 14, FIG. 15 and FIG. 16. The worm shaft hole (203) is set up on one side of the knotter rack (2), and the worm shaft (18) is installed in the worm shaft hole (203). The rope-gripping driven bevel gear (19) fixed with the worm shaft (18) meshes with the rope-gripping driving incomplete bevel gear (20).

The shaft angle between axial lead d of knotter jaw axle hole (204) and axial lead a of main shaft hole of knotter rack (201) is 98 degrees, the shaft angle between axial lead c of worm shaft hole (203) and axial lead a of main shaft hole of knotter rack (201) is 90 degrees, the shaft angle between axial lead d of knotter jaw axle hole (204) and axial lead c of worm shaft hole (203) is 30 degrees, the shaft angle between axial lead e of rope-gripping plate axle hole (205) and axial lead c of worm shaft hole (203) is 72 degrees, and the shaft angle between axial lead b of the cutter arm shaft hole (202) and axial lead d of knotter jaw axle hole (204) is 90 degrees. By the above-mentioned optimized arrangement of the axis lines angle of the described knotter rack (2), the power drive of knotting motions is realized and the space of the knotter rack (2) is fully used, which makes structure parameters matching of the knotter more reasonable and is convenient for processing the axle holes on the knotter rack (2).

Figure 18:
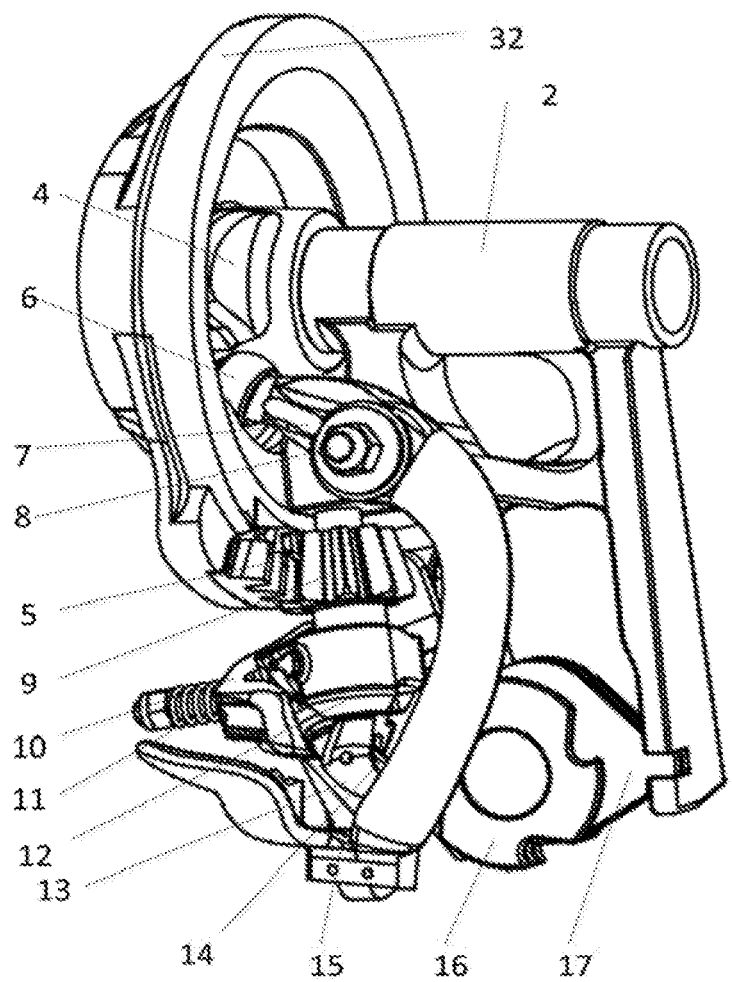
FIG. 18 is the forward view of D-knotter in available technology.
Figure 19:
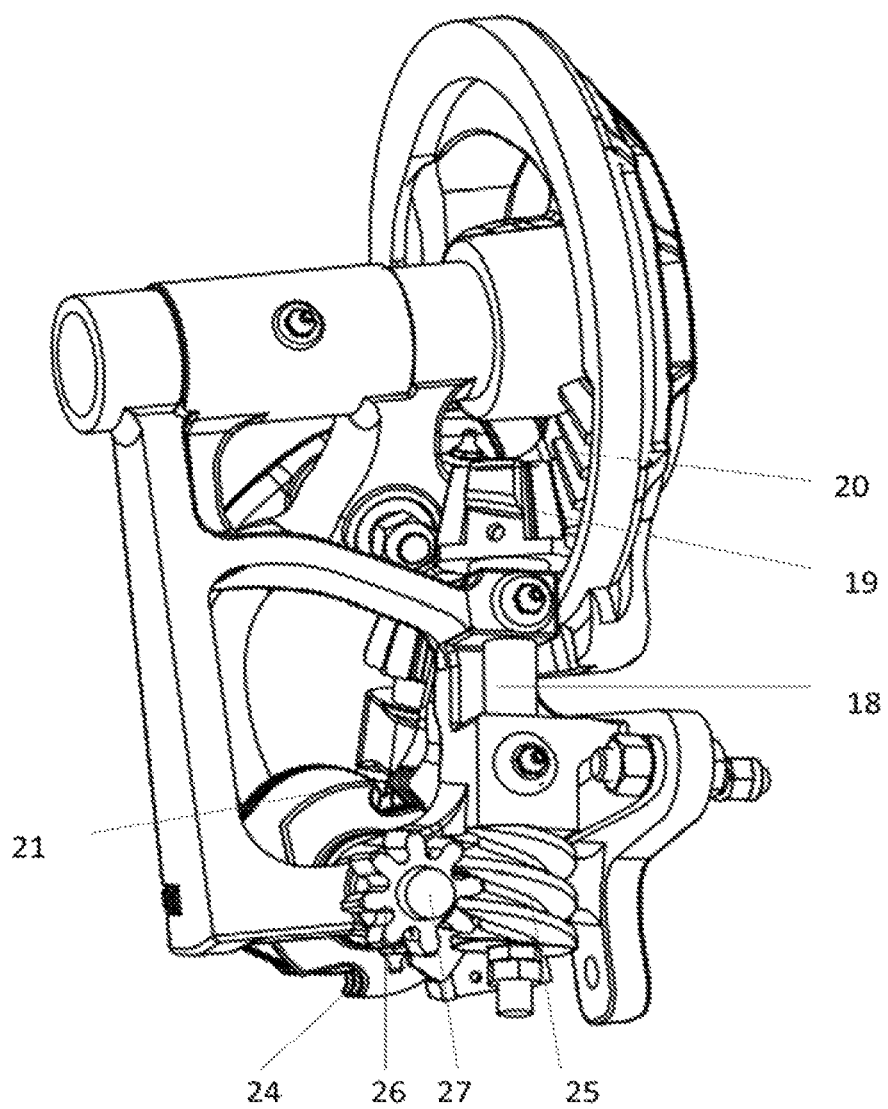
FIG. 19 is the backward view of D-knotter in available technology.

From the above, the knotter invented by the patent is different from D-knotter shown in FIG. 18 and FIG. 19, which differences lie in the spatial structure and transmission arrangement of two types of knotter. When the knotter driven by double fluted disc works, the small fluted disc (1) and the large fluted disc (3) are synchronously driven to rotate by main shalt of the knotter, and the rope is firstly carried to the rope-gripping groove (24) by a rope-conveying needle. The rope-gripping driving incomplete bevel gear (20) on the small fluted disc (1), which can control the action of the rope gripper (J), meshes with the rope-gripping driven bevel gear (19) fixed on one end of the worm shaft (18). The involute worm gear (25) fixed on another end of the worm shaft (18) meshes with the spiral gear (26), and the rope-gripping plate (16) is driven to rotate. The rope is gripped between the rope-gripping moving plate (21) and the rope-gripping plate (16) as the rope-gripping plate (16) rotates, and the rope overlaps on the surface of the knotter jaw (13). After the small fluted disc (1) rotates a phase angle, the knotting driving incomplete bevel gear (5) on the large fluted disc (3), which can control the rotation of the knotter jaw (13), meshes with the knotting driven bevel gear (9) fixed on the end of the blotter jaw (13) as the large fluted disc (3) rotates, and the knotter jaw (13) is driven to rotate. The rope with a ring is twined on the surface of the knotter jaw (13). Meanwhile, under the control of the cylinder cam (12) on the knotter rack (2), the bill hook (14) opens to hook the rope and closes to clamp the rope between the knotter jaw (13) and the bill hook (14). After the large fluted disc (3) continues to rotate a phase angle, the grooved cam (4) controls the cutter arm (5) to swing, and the rope-cutting knife (15) installed on the cutter arm (5) cuts off the rope under the rope gripper (J). And next, the arcuate gap of cutter arm (30) forcibly trips off the knot twined on the surface of the knotter jaw (13). Finally, a fast knot is finished. When the large fluted disc (3) rotates to its initial position, the cutter arm (7) swings back to its initial position in reverse. So, a whole knotting process is over, and the described knotter will prepare to start next knotting.

FIG. 20 is the coordinate system of establishing space theoretic contour curved surface of the grooved cam (4).

The described embodiment is the preferred mode of execution for the invention, but the invention is not confined to above-mentioned mode of execution. Without deviating from the substance of the invention, any obvious, improvement, substitution or variant made by technical personnel of the field belongs to the protection scope of the invention.

What is claimed is:

1. A blotter driven by double fluted disc comprising: a small fluted disc (1), a knotter rack (2), a large fluted disc (3), a cutter arm (7) installed on the knotter rack (2), a knotter jaw and bill hook combined mechanism (R), a rope gripper driving mechanism (Q) and a rope gripper (J): wherein the small fluted disc (1) and the large fluted disc (3) are coaxially fixed on both sides of a main shaft hole of knotter rack (201);

the knotter jaw and bill hook combined mechanism (R) and the rope gripper driving mechanism (Q) are installed on both sides of the knotter rack (2) respectively, a knotting driving incomplete bevel gear (5) is set up on the outer circumference of the large fluted disc (3); a cutter arm roller (6) is installed on the end of the cutter arm (7) matches up with a grooved cam (4) distributed on the inner side of the large fluted disc (3);

a knotting driven bevel gear (9) meshes with the knotting driving incomplete bevel gear (5); a rope-gripping driving incomplete bevel gear (20) is set up on the outer circumference of the small fluted disc (1), and a rope-gripping driven bevel gear (19) meshes with the rope-gripping driving incomplete bevel gear (20).

2. The knotter driven by double fluted disc of claim 1, wherein the rope gripper driving mechanism (Q) drives the rope gripper (J), three rope-gripping grooves (24) are evenly distributed along an edge of a rope-gripping plate (16) in the rope gripper (J), a thread number of an involute worn gear (25) fixed to an edge of a worn shaft (18) is two, and a rope-gripping driven bevel gear (19) is fixed to another edge of the worm shaft (18), a teeth number of a spiral gear (26) meshing with the involute worm gear (25) is six.

3. The knotter driven by double fluted disc of claim 1, wherein the outline of the cutter arm roller (6) is cylinder, and the surface of the grooved cam (4) is space contour curved surface, a line contact is formed between the cylinder surface of the cutter arm roller (6) and the space contour curved surface of the grooved cam (4), and the cutter arm roller (6) rolls along the space contour curved surface of the grooved cam (4).

4. The knotter driven by double fluted disc of claim 1, wherein the knotter jaw and bill hook combined mechanism (R) matches with a cylinder cam (12) on the knotter rack (2), and contour of the cylinder cam (12) is Archimedes spiral.

5. The knotter driven by double fluted disc of claim 3, wherein the space contour curved surface of the grooved cam (4) is an enveloping surface as described below in the line of center (P) point and center (Q) point in a static coordinate system $0_{-xyz}$, establishing processes of the space theoretic contour curved surface are as follows:

the center point of the upper surface of the cutter arm roller (6) is marked with P, and the center point of the lower surface of the cutter arm roller (6) is marked with (Q);

vertical line ($PO_1$) is derived from the center point (P) of the upper surface of the cutter arm roller (6) to the axis line of cutter arm shaft (8) along the direction of rotational central shaft of the large tinted disc (3); their intersection point is regarded as ($O_1$) which is the center of the dynamic coordinate system; the dynamic coordinate system is established and represented as $O_1$-$x_1y_1z_1$ according to the right-hand rule, its $x_1$ axis is along the direction of the vertical line ($PO_1$), and its vi axis is defined as the swing central axis of the cutter arm roller (6); the vertical line ($PO_1$) is set up through the point ($O_1$), which is perpendicular to rotational center shaft of the large tinted disc (3); their vertical intersection is the center of the static coordinate system, which is marked with point (O); in the static coordinate system, its x axis is parallel to $x_1$ axis, and its y axis is parallel to $y_1$ axis: the static coordinate system is also represented as $O_{-xyz}$ according to the right-hand rule; in the initial position, the dynamic coordinate system is obtained by translating the static coordinate system m length unit along the negative direction of z axis and n length unit along the negative direction of y axis;

the angle between the line ($PO_1$) and the $x_1$ axis is $\theta_0$ degree, and the swing angle of the cutter arm is $\theta$ degree in initial position; the length of the vertical line ($PO_1$) is l, and the distance between point P and point (Q) is f; in the dynamic coordinate system, the coordinate of point (P) and point (Q) is expressed as (l cos ($\theta+\theta_0$), −l sin ($\theta+\theta_0$), 0) and ((l−f) cos ($\theta+\theta_0$), −(l−f) sin ($\theta+\theta_0$), 0) respectively;

an angle $\beta$ is the rotation angle between the dynamic coordinate system and the static coordinate system around x axis in clock-wise at any time; coordinate of any point between the static coordinate system and the dynamic coordinate system is derived from below transformation relation $$\begin{bmatrix} x \\ y \\ z \\ 1 \end{bmatrix} = \begin{bmatrix} 1 & 0 & 0 & 0 \\ 0 & 1 & 0 & -n \\ 0 & 0 & 1 & -m \\ 0 & 0 & 0 & 1 \end{bmatrix} \begin{bmatrix} 1 & 0 & 0 & 0 \\ 0 & \cos\beta & -\sin\beta & 0 \\ 0 & \sin\beta & \cos\beta & 0 \\ 0 & 0 & 0 & 1 \end{bmatrix} \begin{bmatrix} 1 & 0 & 0 & 0 \\ 0 & 1 & 0 & n \\ 0 & 0 & 1 & m \\ 0 & 0 & 0 & 1 \end{bmatrix}$$

$$\begin{bmatrix} x1 \\ y1 \\ z1 \\ 1 \end{bmatrix} = \begin{bmatrix} x1 \\ (y1+n)\cos\beta - (z1+m)\sin\beta - n \\ (y1+n)\sin\beta + (z1+m)\cos\beta - m \\ 1 \end{bmatrix}$$

where $x_1$, $y_1$ and $z_1$ are three coordinates of any point in the dynamic coordinate system, and x, y and z are three coordinates of any point in the static coordinate system; thus, the homogeneous coordinates of point (P in the static coordinate system is expressed as $$\begin{bmatrix} l\cos(\theta-\theta_0) \\ -l\sin(\theta-\theta_0)\cos\beta + n\cos\beta - m\sin\beta - n \\ -l\sin(\theta-\theta_0)\sin\beta + n\sin\beta + m\cos\beta - m \\ 1 \end{bmatrix}$$

the homogeneous coordinates of point (Q) in the static coordinate system is expressed as $$\begin{bmatrix} (l-f)\cos(\theta-\theta_0) \\ -(l-f)\sin(\theta-\theta_0)\cos\beta + n\cos\beta - m\sin\beta - n \\ -(l-f)\sin(\theta-\theta_0)\sin\beta + n\sin\beta + m\cos\beta - m \\ 1 \end{bmatrix}$$

Where, turning angle $\theta$ of the cutter arm (7) at rise travel phase $[0,\pi/3]$ of the grooved cam (4) is determined by $$\theta = -\frac{\theta_1}{2\pi}\sin\left[\frac{2\pi(\beta-\varphi)}{\phi-\varphi}\right]+\frac{\theta_1}{\phi-\varphi}(\beta-\varphi)$$

and the turning angle θ of the cutter arm (7) at return stroke phase [π/3,2π/3] of the grooved cam (4) is determined by $$\theta = \theta_1 + \frac{\theta_1}{2\pi}\sin\left[\frac{2\pi(\beta-\emptyset)}{\omega}\right]-\frac{\theta_1}{\omega}(\beta-\emptyset)$$

Where, $\theta_1$ is the maximum swing angle of the cutter are (7), φ is starting phase angle of the grooved cam (4) at rise travel, Ø is ending phase angle of the grooved cam (4) at rise travel, and ω is ending phase angle of the grooved cam (4) at return stroke.

6. The knotter driven by double fluted disc of claim 3, wherein both ends of the cutter arm roller (6) have a circular arc chamfering.

7. The blotter driven by double fluted disc of claim 2, wherein a nut boss (2501) is set up at an end of the involute worm gear (25).

8. The knotter driven by double fluted disc of claim 1, wherein the knotter rack (2) also comprises a worm shaft hole (203), a knotter jaw axle hole (204) and a rope-gripping plate axle hole (205); the knotter jaw axle hole (204) and the main shaft hole of knotter rack (201) are set up with a type of non-orthogonal intersecting axis; the worm shaft hole (203) is perpendicular to the main shaft hole of knotter rack (201); a cutter arm shaft hole (202) is perpendicular in space to the knotter jaw axle hole (204); the rope-gripping plate axle hole (205) is perpendicular to the main shall hole of knotter rack (201).

9. The knotter driven by double fluted disc of claim 8, wherein a shaft angle between axial lead d of the knotter jaw axle hole (204) and axial lead a of the main shaft hole of knotter rack (201) is 98 degrees, a shaft angle between axial lead d of the knotter jaw axle hole (204) and axial lead c of the worm shaft hole (203) is 30 degrees, and a shaft angle between axial lead e of the rope-gripping plate axle hole (205) and axial lead c of the worm shaft hole (203) is 72 degrees.

10. The knotter driven by double fluted disc of claim 1, wherein the cutter arm (7) is hinged into a cutter arm shaft hole (202) by a cutter arm shaft (8); the cutter arm shaft (8) is sustained in the cutter arm shaft hole (202) by a pair of plain bearings (29) installed symmetrically and first thrust ball bearing (28); both ends of the cutter arm shaft (8) are connected and fixed by bolts.

11. The knotter driven by double fluted disc of claim 1, wherein bosses (209) are set up among an end surface of a rope-gripping plate (16), an end surface of a spiral gear (26) and an end surface of a rope-gripping plate axle hole (205).

12. The knotter driven by double fluted disc of claim 1, wherein a second thrust ball bearing (31) is installed between an end surface of a spiral gear (26) and an end surface of a rope-gripping plate axle hole (205).

* * * * *